United States Patent
Heilper et al.

(10) Patent No.: US 9,665,454 B2
(45) Date of Patent: May 30, 2017

(54) EXTRACTING TEST MODEL FROM TEXTUAL TEST SUITE

(71) Applicant: International Business Machines Corporation, Armonk, NY (US)

(72) Inventors: Andre Heilper, Haifa (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/277,104

(22) Filed: May 14, 2014

(65) Prior Publication Data
US 2015/0331770 A1    Nov. 19, 2015

(51) Int. Cl.
*G06F 9/44* (2006.01)
*G06F 11/263* (2006.01)

(52) U.S. Cl.
CPC .................. *G06F 11/263* (2013.01)

(58) Field of Classification Search
CPC .. G06F 11/36; G06F 11/3664; G06F 11/3668; G06F 11/3604; G06F 11/3608; G06F 11/3612; G06F 11/3616; G06F 11/362; G06F 11/3624; G06F 11/3628; G06F 11/3632; G06F 11/3636; G06F 11/364; G06F 11/3644; G06F 11/3648; G06F 11/3652; G06F 11/3656; G06F 11/366; G06F 11/3672; G06F 11/3676; G06F 11/368; G06F 11/3684
USPC .................................................. 717/124–135
See application file for complete search history.

(56) References Cited

U.S. PATENT DOCUMENTS

| | | | |
|---|---|---|---|
| 6,556,987 B1 | 4/2003 | Brown et al. | |
| 7,480,602 B2 * | 1/2009 | Duffie | G06F 11/263 703/13 |
| 7,587,381 B1 | 9/2009 | Remy et al. | |
| 7,836,346 B1 * | 11/2010 | Davidov | G06F 11/3692 714/38.1 |
| 7,970,601 B2 * | 6/2011 | Burmester et al. | 704/9 |
| 8,180,755 B2 | 5/2012 | Dalvi et al. | |
| 2001/0010091 A1 * | 7/2001 | Noy | G01R 31/31707 716/106 |
| 2002/0138491 A1 * | 9/2002 | Bax | G06F 17/271 |
| 2004/0128650 A1 * | 7/2004 | Chamberlain | G06F 11/3684 717/124 |

(Continued)

OTHER PUBLICATIONS

Bringmann, Eckard and Kramer, Andreas, "Model-based Testing of Automotive Systems," 2008 International Conference on Software Testing, Verification, and Validation, IEEE, Apr. 9-11, 2008, pp. 485-493.*

(Continued)

*Primary Examiner* — Wei Zhen
*Assistant Examiner* — Andrew M Lyons
(74) *Attorney, Agent, or Firm* — Ziv Glazberg (57) ABSTRACT

Computer-implemented method, computerized apparatus and computer program product for extracting test model from a textual test suite. The method comprises obtaining a test suite comprising test descriptions. The test descriptions are analyzed to extract attributes and values of a test model modeling a test space. Using the extracted attributes and values, the test model may be created. In some cases, the test model may be partial test model that a user can use as a starting point for manually modeling the textual test suite.

17 Claims, 4 Drawing Sheets

(56) References Cited

U.S. PATENT DOCUMENTS

| | | | |
|---|---|---|---|
| 2004/0133881 A1* | 7/2004 | Chamberlain | G06F 11/3684 717/125 |
| 2004/0154000 A1* | 8/2004 | Kasravi et al. | 717/130 |
| 2004/0167911 A1 | 8/2004 | Wakefield et al. | |
| 2005/0102596 A1* | 5/2005 | Hekmatpour | G01R 31/31835 714/741 |
| 2005/0108630 A1 | 5/2005 | Wasson et al. | |
| 2005/0223295 A1* | 10/2005 | Hermes | G06F 11/3684 714/38.1 |
| 2006/0129418 A1* | 6/2006 | Lee | G06Q 10/06 704/9 |
| 2007/0022407 A1* | 1/2007 | Givoni | G06F 11/3414 717/124 |
| 2008/0034351 A1* | 2/2008 | Pugh | G06F 11/36 717/128 |
| 2009/0259669 A1* | 10/2009 | Abbruzzi | G06F 17/30536 |
| 2009/0313506 A1* | 12/2009 | Elizarov et al. | 714/37 |
| 2009/0319252 A1* | 12/2009 | De | G06F 17/504 703/14 |
| 2010/0076724 A1* | 3/2010 | Brown | G06Q 50/04 702/179 |
| 2010/0153318 A1 | 6/2010 | Branavan et al. | |
| 2010/0195909 A1* | 8/2010 | Wasson | G06F 17/241 382/176 |
| 2010/0218165 A1* | 8/2010 | Ali | 717/104 |
| 2010/0325491 A1* | 12/2010 | Kumanan et al. | 714/38 |
| 2011/0276944 A1* | 11/2011 | Bergman et al. | 717/124 |
| 2011/0295591 A1 | 12/2011 | Fang et al. | |
| 2012/0166370 A1 | 6/2012 | Hu et al. | |
| 2012/0179633 A1* | 7/2012 | Ghani | G06F 17/30705 706/12 |
| 2012/0272206 A1* | 10/2012 | Sengupta et al. | 717/101 |
| 2012/0331439 A1* | 12/2012 | Zimmermann et al. | 717/101 |
| 2013/0226611 A1* | 8/2013 | Son | G06Q 10/10 705/2 |
| 2013/0226942 A1* | 8/2013 | Denoual | G06F 17/30023 707/754 |
| 2013/0332905 A1* | 12/2013 | Vikutan et al. | 717/124 |
| 2014/0026125 A1* | 1/2014 | Pasala | G06F 11/3684 717/126 |
| 2014/0282031 A1* | 9/2014 | Hinterbichler et al. | 715/738 |
| 2015/0199333 A1* | 7/2015 | Nekhay | G06F 17/278 704/9 |
| 2015/0207811 A1* | 7/2015 | Feher | G06F 21/577 726/25 |

OTHER PUBLICATIONS

Kuhn, Rick and Kacker, Raghu, "Practical Combinatorial (t-way) Methods for Detecting Complex Faults in Regression Testing," 2011 27th IEEE International Conference on Software Maintenance, IEEE, Sep. 25-30, 2011, p. 599.*

Coenen et al., "A semi-automated approach to building text summarisation classifiers", Journal of Theoretical and Applied Computer Science, vol. 6, No. 4, 2012, pp. 7-23.

Laurie Paulson, "Evaluating a cross-linguistic grammar model: Methodology and test-suite resource development", A thesis submitted in partial fulfillment of the requirements for the degree of Master of Arts, University of washington, 2006.

Kluegl et al., "Test-Driven Development of Complex Information Extraction Systems using TEXTMARKER", 4th International Workshop on Knowledge Engineering and Software Engineering, KESE 2008, 31st German conference on artificial Intelligence, Germany, Sep. 2008.

* cited by examiner

EXTRACTING TEST MODEL FROM TEXTUAL TEST SUITE

TECHNICAL FIELD

The present disclosure relates to testing in general, and to modeling the test space, in particular.

BACKGROUND

Testing is an important activity to be performed with any system that is being developed. One common practice is to design tests to be performed by testers or other QA personnel by creating test descriptions for the QA personnel to use. The designed tests can be stored and be used repeatedly, for example each time the system is updated or during regression tests.

Over time, there may be a considerable amount of tests relating to the system. Some features may change over time, potentially requiring adding, changing and removing some tests. In addition, as the tests may be designed by different people or even by the same person at different times, some of the tests may be redundant as they cover functionalities that are already covered by other features. On the other hand, although there may be a vast number of tests, some functionalities of the system may not be covered by any one of them.

As the test suite grows larger, managing the tests becomes an increased burden. It becomes harder and harder to identify which tests are missing, which have become redundant, whether tests may be consolidated, and so forth. This is in particularly true in large systems maintained by several different people whose identities change over time.

A model of the test-space, herein referred to as "model", may be useful for assisting in test planning, coverage analysis, or other test related activities. The model may define tests that are within the test-space, based on any aspect of the tests, such as but not limited to inputs, scenarios, configurations, or the like. The model comprises a set of functional attributes, respective domains of values for each attribute, and potentially restrictions on the value combinations. Each attribute may relate to a different aspect of a test, such as, for example, operation to be performed, input to be provided, or the like. Each test is represented by a valuation to each of the attributes of the model that together define the functionality of the test. The model may be used to identify redundant tests, to identify missing tests or aspects of the system that are uncovered by the test suite, or the like.

In some cases, Combinatorial Test Design (CTD) may be used for test planning purposes based on the test suite. CTD may be based on a desired coverage goal of the model, which may be defined as a target level of interaction between the attributes (e.g., pair-wise interaction, 3 attributes interaction, or the like). Using CTD, additional tests may be defined to cover uncovered functionalities.

In some cases, test selection may be performed to reduce a size of the test suite without changing the covered test-space or while maintaining a same coverage level with respect to a coverage goal. The test selection may be performed based on the model of the test-space.

BRIEF SUMMARY

One exemplary embodiment of the disclosed subject matter is a computerized apparatus having a processor, the processor being adapted to perform the steps of: obtaining a test suite comprising test descriptions; analyzing the test descriptions to extract attributes and values of a test model modeling a test space; and creating the test model using the extracted attributes and values.

Another exemplary embodiment of the disclosed subject matter is a method comprising: obtaining a test suite comprising test descriptions; analyzing, by a processor, the test descriptions to extract attributes and values of a test model modeling a test space; and creating the test model using the extracted attributes and values.

Yet another exemplary embodiment of the disclosed subject matter is a computer program product comprising a non-transitory computer readable medium retaining program instructions, which instructions when read by a processor, cause the processor to perform a method comprising: obtaining a test suite comprising test descriptions; analyzing the test descriptions to extract attributes and values of a test model modeling a test space; and creating the test model using the extracted attributes and values.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure, a "system" is any computerized system that is being tested. The system may be, but is not limited to, hardware, software, firmware, or the like.

In the present disclosure, a "model" is a model of a test space that comprises at least attributes, each of which has a respective domain of values. The model may also include restrictions on combination of values.

In the present disclosure, a "test description" is a description provided in free text of a test to be performed on the system. The test description may include instructions for a QA personnel to perform to test the system. The description may be provided in free text and not adhere to any formal grammar. In some exemplary embodiments, the description may include a combination of both semi-formal language, such as pseudo code, and natural language, such as English. In some cases, the description may be written in several languages, such as English and Japanese. In some cases, in order to run the test, the tester performs the steps described in the test description, potentially in a specific order, and potentially checks the results against expected results.

One technical problem addressed by the disclosed subject matter is to define a test model based on a given test suite. The test suite may include test descriptions designed over time and potentially by different people. The test model may be useful in concisely describing the test-space, the covered portion of the test-space, or the like. By modeling the test-space, it can also be relatively easier to identify redundant tests at different levels of redundancy (e.g., duplicate test, test that covers features that covered by other tests, tests the covers pairs of features that are covered by other tests, or the like).

Modeling the test-space based on the test descriptions may be performed manually. However, such a task may be labor intensive and require investing time to manually review and comprehend the entire test suite.

One technical solution utilized by the disclosed subject matter is to extract information regarding attributes and their values from the test description. The extracted information may be used to create a test model describing the test suite. In some cases, the process may be a semi-automatic process in which a user may be involved to review suggestions automatically determined by the disclosed subject matter.

In some exemplary embodiments, the test descriptions are partitioned into text blocks. Text blocks may be compared with one another to identify the blocks which differ in exactly one text word within the text blocks. The difference may be attributed to a different value of the attribute and may be provided as a suggestion for a value. In some exemplary embodiments, the difference may relate to a name of the attribute in a case where two or more attributes share values, such as in case of the values: ENABLE, DISABLE. In some exemplary embodiments, after all blocks that differ in one value are processed, the process may continue iteratively for blocks that differ in two words, in three words and so forth until a maximum threshold is reached or until all text blocks were processed.

The text block may be of different granularity level. One example can be a text line. Additionally or alternatively, the text block may be one or more lines which are considered semantically connected by a Natural Language Processing (NLP) tool. Other granularity levels may also be used.

The text word may be a word or other basic block within the text block, such as a token, a combination of symbols, or the like.

In some exemplary embodiments, the disclosed subject matter may provide for a semi-automatic method in which a user is provided with suggestions for attributes/values based on textual difference in the test descriptions, and the user may either approve, decline, or modify the suggestions.

In some exemplary embodiments, in case there are several text blocks that differ in one or more text word that is located at the same location within the text blocks, the several text blocks may be displayed together as a single cluster.

In some exemplary embodiments, in response to extracting a value for an attribute from a test description, the test description may be mapped to a coverage task in the model for which the value of the attribute is the extracted value. In some exemplary embodiments, after the process completes, the mapping may provide coverage tasks for potentially each test description, which may be used to determine coverage of the test suite, identify holes in coverage, perform test selection, or the like.

In some exemplary embodiments, in response to identifying attribute/value from a test description based on difference between two or more text blocks, the disclosed subject matter may search the test descriptions for additional usages of the same attribute/value, which may allow to map additional test description to the model, may improve the model by identifying additional values for a domain of the attribute, or the like.

In some exemplary embodiments, a textual difference between two or more blocks may occur by mistake, such as in case of a typo or in case in two locations, the same value/attribute was referred to using a different name. The user may identify such cases and provide an input indicating that the two occurrences should be unified. In some exemplary embodiments, the user may indicate which text block is "correct", i.e., uses the naming convention that the user uses in modeling the model.

In some exemplary embodiments, a single text block may appear in several test descriptions or even multiple times within the same test description. In such a case, the disclosed subject matter may uniformly refer to the text block, so that after processing a single occurrence, all occurrences are used for mapping test descriptions to the model.

In some exemplary embodiments, in case a single attribute is given different values in the same test description, the disclosed subject matter may create several attributes in the model so as to allow indicating the first value, the second value, and so forth.

Figure 1:
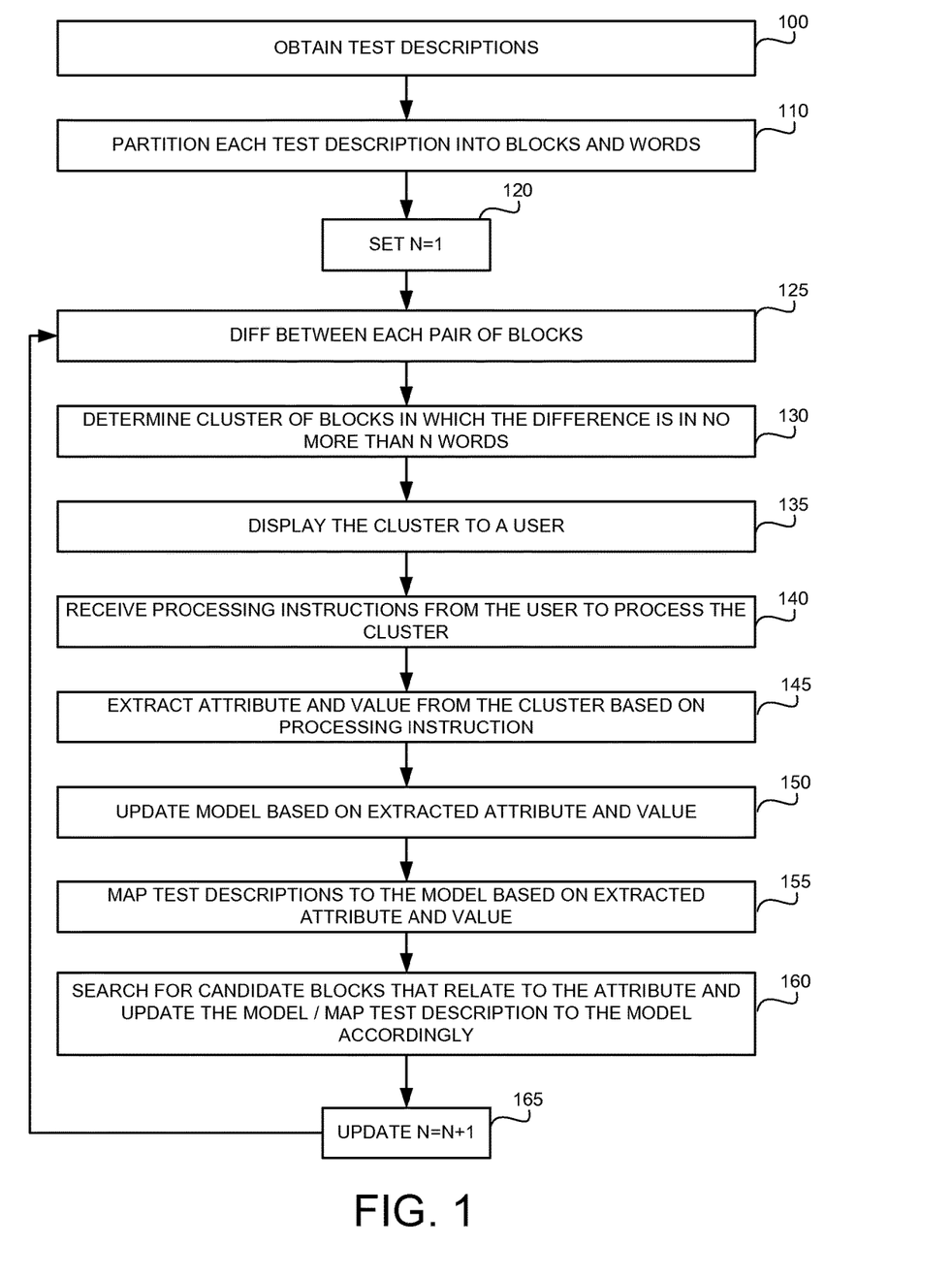
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the disclosed subject matter.

In Step 100, test descriptions may be obtained. The test descriptions may be obtained from a repository, a remote storage, computer-readable device, or the like. In some exemplary embodiments, the test description may be referred to together as a test suite.

In Step 110, each test description may be partitioned into text blocks. Additionally or alternatively, each block may be partitioned to text words. In some exemplary embodiments, the granularity level may be of a text line and separate words. However, the disclosed subject matter is not limited to such granularity level.

In some exemplary embodiments, identical text blocks may be assimilated in Step 110 so as to be treated uniformly and avoid duplicate outputs to the user.

In Step 120, a variable named N is set to one (1). N may indicate an edit distance to be used. The edit distance indicated a number of edits that need to be performed to a first text block to obtain a second text block. In some exemplary embodiments, the edit distance is weighted so that the penalty for change/substitution is lower than that for insert and delete. In some exemplary embodiments, insert or delete may be associated with seamlessly infinite penalty. In some exemplary embodiments, the edit distance may be used to identify in how many text words two text blocks differ.

In Step 125, a difference between each pair of text blocks is performed. In some exemplary embodiments, a matrix may be computed, wherein in each cell, the edit distance between two blocks is retained.

In Step 130, a cluster of blocks is identified. The cluster may comprise blocks whose edit distance is exactly N from one another. Additionally or alternatively, the cluster may comprise blocks whose edit distance is at most N from one another. In some exemplary embodiments, the cluster may comprise blocks that whose difference is in the same one or more locations within the blocks, such as they differ in the second word and in the tenth word.

In Step 135, the cluster may be displayed to the user. In some exemplary embodiments, the display may visually indicate the difference between the blocks.

In Step 140, the user may provide processing instructions for the cluster.

One processing instruction may be to unify two blocks, such as in case of a typo or use of a different name for the same attribute or value. Such a processing instruction may cause to assimilate the text blocks and refer to them uniformly. In some exemplary embodiments, the user may identify a preferred block which is preserved (e.g., the block without the typo, the block using the terms to be used in the mode, or the like). Another processing instruction may indicate that the difference is attributed to a value of an attribute or a name of an attribute. Yet another processing instruction may indicate which one or more locations within the text block indicates a name of the attribute and which indicate a value of the attribute, thereby allowing the extract names and values of attributes from the test description and to include them in the model.

In Step 145, name and value of an attribute information is extracted based on the processing instruction. In some exemplary embodiments, the difference between the blocks may be a different value of the same attribute. In such a case, the value may be extracted from the text word that differs between the clusters. Optionally, the value may include additional text words that may not be different in the blocks of the cluster. Optionally, the name of the attribute is also mentioned in the text block, though it may not differ from one cluster to another. Additionally or alternatively, the name of the attribute may be extracted from the text words that differ from one block to the other and the value may remain unmodified. Additionally or alternatively, both the attribute and the value may change from block to block.

In some exemplary embodiments, the processing instruction may provide an explicit name of the attribute or an explicit value of the attribute instead of indicating from which location in the text block that information may be extracted. Such an instruction may be useful in case the name/value of the attribute does not appear explicitly in the text blocks, but is rather implicit.

In Step 150, the model may be updated to include the attribute, if such an attribute is not already present in the model. Additionally or alternatively, the model may be updated to include in the domain of the attribute the value, if such a value is not already present in the domain of the model.

In Step 155, test descriptions that included the text blocks of the cluster (or other text blocks that were assimilated together) are mapped to the model by indicating for each test description the value it indicates for the attribute. In some exemplary embodiments, each test description may be associated with a coverage task. Mapping may be performed by updating the coverage task to assign the value to the attribute.

In Step 160, additional blocks may be searched for. The additional blocks may relate to the attribute, the value, or the like. As an example, in case a new attribute named "input file" was added to the model, the blocks may be searched for additional references to "input file". Such references may be assumed to be relevant and potentially indicate value for the attribute. The process may be semi-automatically in which potential matches are outputted to a user who indicates how to process each such potential match. As another example, in case a value is added to the model, the same value may be searched for in other blocks as well. In some exemplary embodiments, based on processing of the potential matches, the model may be updated to include new attributes or new values. Additionally or alternatively, test descriptions may be mapped to the model based on their content.

In Step 165, the value of N may be incremented and the process may be performed again. In some exemplary embodiments, the process may be performed until all text blocks are processed. In some exemplary embodiments, each text block is processed only once and after being processed once it does not appear again as a basis for additional modeling the model. In some exemplary embodiments, in case N exceeds a predetermined threshold, such as four, five, or the like, the process may stop.

In some exemplary embodiments, in case there are less than a predetermined threshold of text blocks that were not yet processed, such as less than twenty, the user may be provided with the list of blocks for processing.

In some exemplary embodiments, after the method of FIG. 1 has completed, the model that was created may be a partial model of the test space and the user may manually complete it by adding values and/or attributes.

In some exemplary embodiments, the user may also manually introduce restrictions over combination of values of two or more attributes in the model. Such restrictions may be useful to exclude illegal test cases from the test space.

Figure 2:
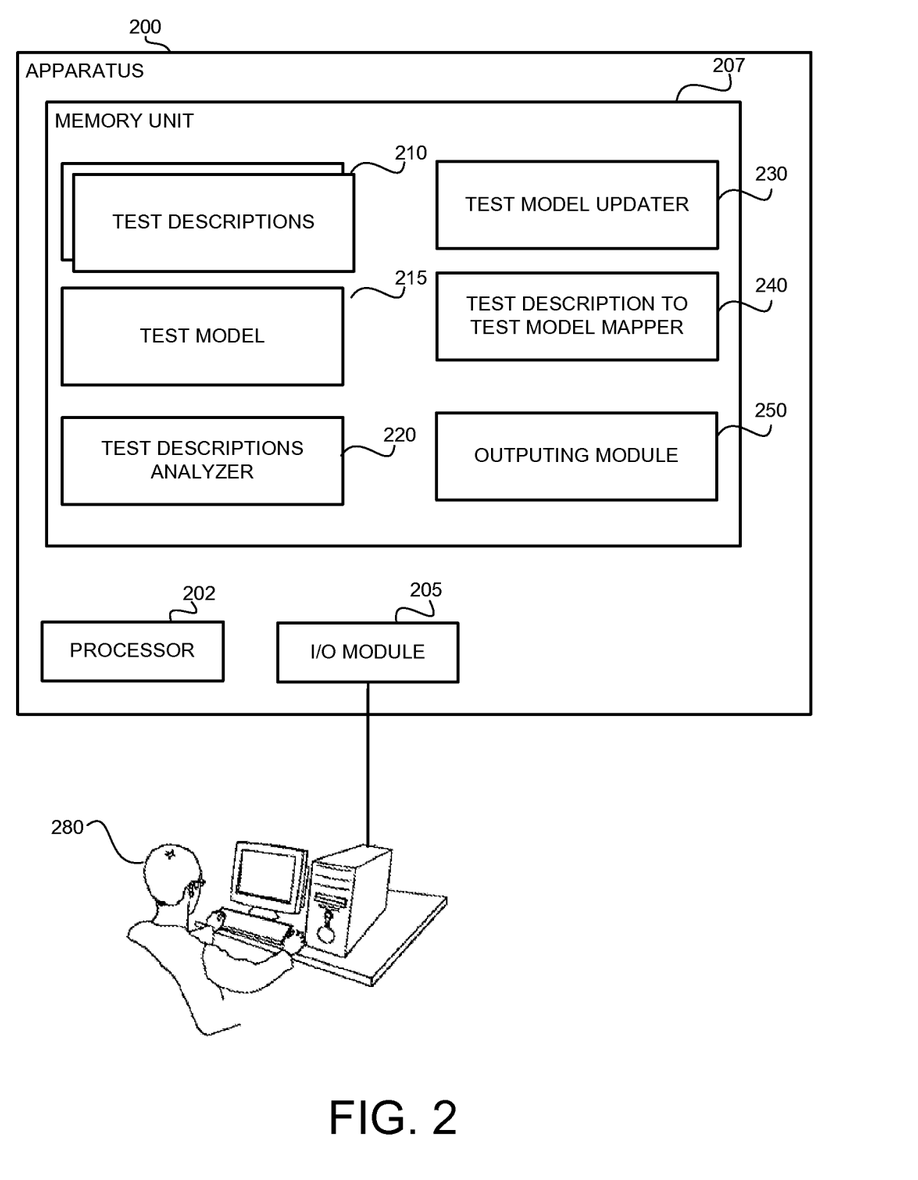
FIG. 2 shows a block diagram of an apparatus, in accordance with some exemplary embodiments of the disclosed subject matter.

Referring now to FIG. 2 showing a block diagram of components of an apparatus, in accordance with some exemplary embodiments of the disclosed subject matter. An apparatus 200 may be a computerized apparatus adapted to perform methods such as depicted in FIG. 1.

In some exemplary embodiments, Apparatus 200 may comprise a Processor 202. Processor 202 may be a Central Processing Unit (CPU), a microprocessor, an electronic circuit, an Integrated Circuit (IC) or the like. Alternatively, Apparatus 200 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 202 may be utilized to perform computations required by Apparatus 200 or any of it subcomponents.

In some exemplary embodiments of the disclosed subject matter, Apparatus 200 may comprise an Input/Output (I/O) Module 205 such as a terminal, a display, a keyboard, an input device or the like to interact with the system, to invoke the system and to receive results. It will however be appreciated that the system can operate without human operation. In some exemplary embodiments, the I/O Module 205 may be utilized to provide an interface to a User 280 to interact with Apparatus 200, such as to provide the output of clusters potentially with visual indication of a difference, to provide processing instructions, to review and update a model based on the test descriptions, or the like.

In some exemplary embodiments, Apparatus 200 may comprise a Memory Unit 207. Memory Unit 207 may be persistent or volatile. For example, Memory Unit 207 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 207 may retain program code operative to cause Processor 202 to perform acts associated with any of the steps shown in FIG. 1.

Memory Unit 207 may retain Test Descriptions 210. In some exemplary embodiments, Test Descriptions 210 may be obtained from a different computerized memory and retained temporarily in Memory Unit 207 during their processing.

Memory Unit 207 may retain a Test Model 215. Test Model 215 may be generated automatically, semi-automatically, or the like based on Test Descriptions 210. Test Model 215 may be completed manually after being generated based on Test Descriptions 210.

Test Descriptions Analyzer 220 may be configured to analyze Test Descriptions 210 in accordance with the disclosed subject matter. Test Descriptions Analyzer 220 may partition Test Descriptions 210 to text blocks; assimilate identical text blocks; compute edit distance or other textual difference measurement with respect to the text blocks; identify potential attribute/value information in the text blocks based on difference between test blocks or based on a known name/value of an attribute using textual search; or the like. In some exemplary embodiments, in response to identifying a new value or a new attribute, Test Model Updater 230 may be invoked to update Test Model 215 accordingly. Additionally or alternatively, in response to identifying a value of an attribute in a text block that is associated with one or more test descriptions of Test Descriptions 210, Test Descriptions to Test Model Mapper 240 may be invoked to map the one or more test descriptions to the model. In some exemplary embodiments, Mapper 240 may update a coverage task associated with each test description so that the attribute is assigned a value that was extracted from the text block.

Outputting Module 250 may be configured to output clusters of text blocks to User 280. The output may provide visual indication of a difference between the text blocks. Output Module 250 may be configured to display Test Model 215, a portion of or all Test Descriptions 210, mapping between one or more test descriptions to Test Model 215, or the like. In some exemplary embodiments, Output Module 250 may be configured to provide a Graphical User Interface (GUI) for the user.

Figure 3:
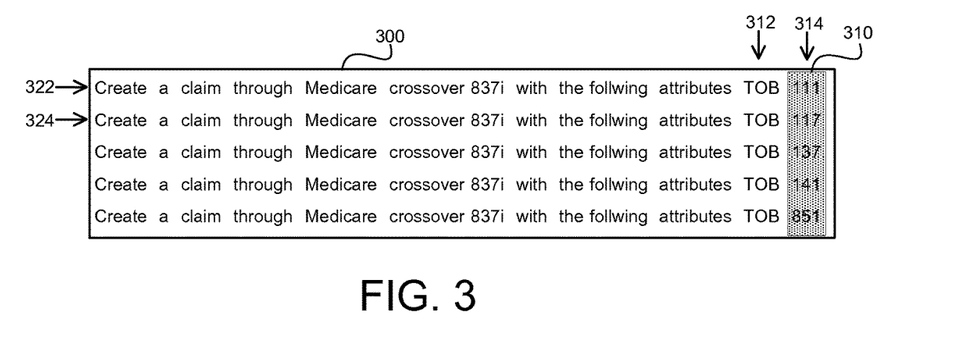
FIG. 3 shows an illustration of an output, in accordance with some exemplary embodiments of the disclosed subject matter.

Referring now to FIG. 3 showing an illustration of an output, in accordance with some exemplary embodiments of the disclosed subject matter. Output 300 may include text blocks that differ in one text word, positioned in a same location within the text block. Column 314 may the location in which the text word differs between one block to another. Visual indication 310 may be provided to visually emphasize the difference.

Each row in the Output 300 may correspond to a different block, such as blocks 322 and 324. It will be noted that a block may appear several times in the test suite. Use of almost identical lines may be an outcome of copy-paste operations. In addition, due to copy-paste with minor modifications, there may be small edit distance between text blocks.

In some exemplary embodiments, Output 300 may correspond to a cluster of blocks. Position 312 may indicate a name of the attribute "TOB". Position 314 may indicate a value of the attribute. Each block may be associated with a different value of the same TOB attribute. The user may provide processing instruction indicating that Position 312 includes the name of the attribute and that Position 314 includes a value of the attribute. The processing instruction may be performed to extract the value/attribute from the cluster, modify the model accordingly, map test descriptions to the model, or the like.

Figure 4A:
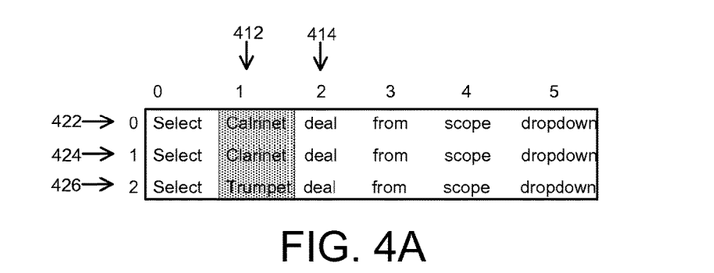
FIG. 4A-4C show illustrations of outputs, in accordance with some exemplary embodiments of the disclosed subject matter.

Referring now to FIG. 4A showing an illustration of an output, in accordance with some exemplary embodiments of the disclosed subject matter. The output of FIG. 4 shows three blocks (422, 424, 426) which differ at Position 412. The difference may be attributed to a different value of the attribute "deal" mentioned in Position 414. However, Block 422 and Block 424 differ by a typo of the word "Clarinet", as opposed to a substantive difference between those blocks and Block 426, which refer to a different value.

Figure 4B:
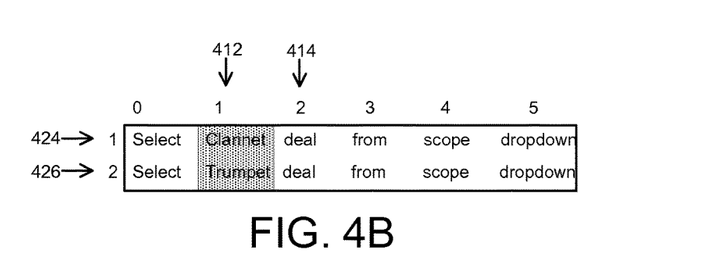

In response to a processing instruction, Block 422 and 424 may be unified into a single block. FIG. 4B shows an output in response to such a processing instruction. In some exemplary embodiments, the user may provide the processing instruction and may indicate which of the two or more blocks to be unified should remain (referred to as a "dominant block"). In the example provided in FIG. 4A-4B, the user may have indicated Block 424 to be the dominant block. In some exemplary embodiments, in response to a processing instruction to unify blocks, the test descriptions may be modified to ensure that the difference does not remain in the future. As an example, the test descriptions may be modified to replace all unified blocks by the dominant block (e.g., Block 422 may be replaced by Block 424).

Figure 4C:
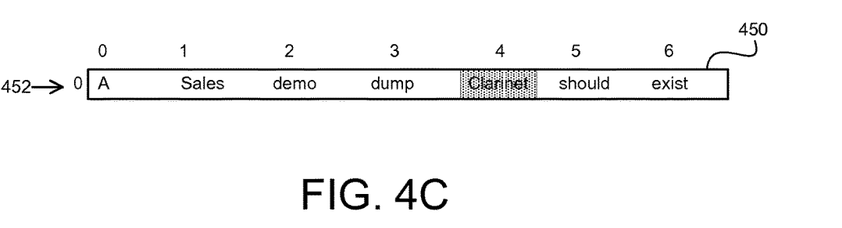

In response to identifying the values Clarinet and Trumpet as values for the attribute "deal" based on the output of FIG. 4B, and potentially based on processing instructions provided by the user, the test descriptions may be searched for additional text blocks that may comprise the same values for the attribute or other values for the attribute. In some exemplary embodiments, Output 450 can be found in such a case. Output 450 includes Block 452 which refers to Clarinet and may therefore be relevant for the "deal" attribute. It can be further noted that the term "deal" does not appear in Output 450 as the designer of the test descriptions may have used a different term to refer to the same attribute. In this case: "Sales demo dump". In some exemplary embodiments, the user may be provided with a suggestion to map this value to the attribute "deal". Additionally or alternatively, the user may provide a processing instruction indicating to which attribute the value should be attributed.

Figure 5:
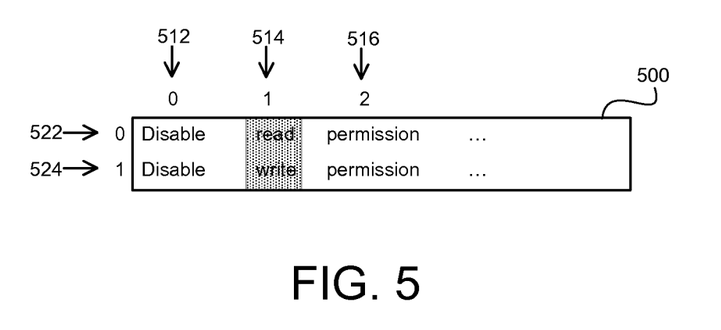
FIG. 5 shows an illustration of an output, in accordance with some exemplary embodiments of the disclosed subject matter.

Referring now to FIG. 5 showing an illustration of an output, in accordance with some exemplary embodiments of the disclosed subject matter. Output 500 indicates two blocks (522, 524) which differ in Position 514. However, a user may identify that Position 514 relates to an attribute and not a value, and the value appears in Position 512. In this example, two different attributes "read permission" and "write permission" happen to share the same value "disable". The user may provide a processing instruction to add the attribute appearing in Positions 514, 516 to the model and add to each of them the value Disable based on the text word in Position 512. In some exemplary embodiments, the processing instruction may be used to map test descriptions comprising the Blocks 522 and 524 (or comprising text blocks unified with them) to the model.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the processor being adapted to perform the steps of:
    obtaining a test suite comprising test descriptions of tests to be performed on a system, wherein each of the test descriptions comprises instructions to a human to perform tests on the system;

analyzing the test descriptions to extract attributes of a test model and to extract values of the extracted attributes, wherein the test model modeling a test space; and wherein said analyzing comprises:
  partitioning a test description into one or more text blocks comprising text words;
  automatically identifying pairs of text blocks that differ in a number of text words, wherein the number of different text words between each pair of text blocks is below a predetermined threshold; and
  extracting a value or an attribute from the text blocks based on different text words in the text blocks;
creating the test model using the extracted attributes and extracted values of the extracted attributes, wherein the test model comprises a set of attributes, each of which has a respective domain of values;
wherein in response to said automatically identifying the pairs of text blocks:
  displaying to a user the pairs of text blocks; and
  receiving an input from the user, wherein the input indicates whether the difference between the pairs of text blocks is indicative of a value or an attribute; and
wherein said extracting is performed based on the input; and
wherein said automatically identifying further comprises:
  receiving a second input from the user indicating two or more different text blocks to be unified into a single text block; and
  unifying the two or more different text blocks to into the single text block, whereby reducing a number of potential extracted attributes or values.

2. The apparatus of claim 1, wherein said displaying comprises displaying the pairs of text blocks and visually indicating a difference between each pair of text blocks.

3. The apparatus of claim 1, wherein said automatically identifying further comprises receiving a second input from the user indicating two or more different text blocks whose difference is to be ignored, wherein the second input indicates a single value or attribute to be used for the two or more different text blocks.

4. The apparatus of claim 1, wherein said automatically identifying comprises identifying a cluster of text blocks that differ in a text word at a same position within each of the text blocks of the cluster.

5. The apparatus of claim 1, wherein the processor being further adapted to perform the step of mapping the test description to the test model based on the extracted attributes and values.

6. The apparatus of claim 1, wherein said creating the test model comprises:
  automatically defining the test model using extracted attributes, whereby a partial test model is created; and
  completing the partial test model based on user input, wherein the user input indicating addition of attributes or values to the partial test model, whereby the partial test model is manually completed to the test model.

7. The apparatus of claim 1, wherein said analyzing the test descriptions comprises:
  extracting a value and an attribute based on a textual difference between test descriptions;
  locating one or more text blocks of the test descriptions in which the attribute appears; and
  identifying one or more values of the attribute in the one or more text blocks.

8. The apparatus of claim 1, wherein at least one test description is a combination of a natural language with a semi-formal language.

9. A method comprising:
  obtaining a test suite comprising test descriptions of tests to be performed on a system, wherein each of the test descriptions comprises instructions to a human to perform tests on the system;
  analyzing, by a processor, the test descriptions to extract attributes of a test model and to extract values of the extracted attributes, wherein the test model modeling a test space, wherein said analyzing comprises:
    partitioning a test description into one or more text blocks comprising text words;
    automatically identifying pairs of text blocks that differ in a number of text words, wherein the number of different text words between each pair of text blocks is below a predetermined threshold; and
    extracting a value or an attribute from the text blocks based on different text words in the text blocks;
  creating the test model using the extracted attributes and extracted values of the extracted attributes, wherein the test model comprises a set of attributes, each of which has a respective domain of values;
  wherein in response to said automatically identifying the pairs of text blocks:
    displaying to a user the pairs of text blocks; and
    receiving an input from the user, wherein the input indicates whether the difference between the pairs of text blocks is indicative of a value or an attribute; and
  wherein said extracting is performed based on the input; and
  wherein said automatically identifying further comprises:
    receiving a second input from the user indicating two or more different text blocks to be unified into a single text block; and
    unifying the two or more different text blocks to into the single text block, whereby reducing a number of potential extracted attributes or values.

10. The method of claim 9, wherein said displaying comprises displaying the pairs of text blocks and visually indicating a difference between each pair of text blocks.

11. The method of claim 9, wherein said automatically identifying further comprises receiving a second input from the user indicating two or more different text blocks whose difference is to be ignored, wherein the second input indicates a single value or attribute to be used for the two or more different text blocks.

12. The method of claim 9, wherein said automatically identifying comprises identifying a cluster of text blocks that differ in a text word at a same position within each of the text blocks of the cluster.

13. The method of claim 9, further comprising mapping the test description to the test model based on the extracted attributes and values.

14. The method of claim 9, wherein said creating the test model comprises:
  automatically defining the test model using extracted attributes, whereby a partial test model is created; and
  completing the partial test model based on user input, wherein the user input indicating addition of attributes or values to the partial test model, whereby the partial test model is manually completed to the test model.

15. The method of claim 9, wherein said analyzing the test descriptions comprises:
  extracting a value and an attribute based on a textual difference between test descriptions;
  locating one or more text blocks of the test descriptions in which the attribute appears; and identifying one or more values of the attribute in the one or more text blocks.

16. A computer program product comprising a non-transitory computer readable medium retaining program instructions, which instructions when read by a processor, cause the processor to perform a method comprising:
   obtaining a test suite comprising test descriptions of tests to be performed on a system, wherein each of the test descriptions comprises instructions to a human to perform tests on the system;
   analyzing the test descriptions to extract attributes of a test model and to extract values of the extracted attributes, wherein the test model modeling a test space; wherein said analyzing comprises:
      partitioning a test description into one or more text blocks comprising text words;
      automatically identifying pairs of text blocks that differ in a number of text words, wherein the number of different text words between each pair of text blocks is below a predetermined threshold; and
      extracting a value or an attribute from the text blocks based on different text words in the text blocks;
   creating the test model using the extracted attributes and extracted values of the extracted attributes, wherein the test model comprises a set of attributes, each of which has a respective domain of values: wherein in response to said automatically identifying the pairs of text blocks:
      displaying to a user the pairs of text blocks; and
      receiving an input from the user, wherein the input indicates whether the difference between the pairs of text blocks is indicative of a value or an attribute; and
   wherein said extracting is performed based on the input; and
   wherein said automatically identifying further comprises:
      receiving a second input from the user indicating two or more different text blocks to be unified into a single text block; and
      unifying the two or more different text blocks to into the single text block, whereby reducing a number of potential extracted attributes or values.

17. The apparatus of claim 1, wherein said automatically identifying further comprises:
   receiving, from the user, a selection of a text block out of the two or more different text blocks; and
   wherein said unifying comprises unifying the two or more different text blocks into the selected text block, whereby enabling the user to indicate a preferred version between syntactically different text blocks.

* * * * *